United States Patent
Kannan et al.

(10) Patent No.: US 9,369,989 B2
(45) Date of Patent: Jun. 14, 2016

(54) METHODS AND APPARATUS FOR COMMUNICATION OF NOTIFICATIONS

(71) Applicant: QUALCOMM Incorporated, San Diego, CA (US)

(72) Inventors: Prasanna Kannan, San Diego, CA (US); An Mei Chen, San Diego, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/580,905

(22) Filed: Dec. 23, 2014

(65) Prior Publication Data
US 2015/0111543 A1    Apr. 23, 2015

Related U.S. Application Data

(62) Division of application No. 11/734,640, filed on Apr. 12, 2007, now Pat. No. 8,942,739.

(60) Provisional application No. 60/864,567, filed on Nov. 6, 2006.

(51) Int. Cl.
*H04W 68/00* (2009.01)
*H04W 68/02* (2009.01)
(Continued)

(52) U.S. Cl.
CPC ......... *H04W 68/005* (2013.01); *H04L 12/1895* (2013.01); *H04L 12/587* (2013.01);
(Continued)

(58) Field of Classification Search
CPC ...... H04W 68/00; H04W 68/02; H04W 68/04
See application file for complete search history.

(56) References Cited

U.S. PATENT DOCUMENTS 6,119,021 A    9/2000 Katz 6,400,942 B1 *  6/2002 Hansson et al. ........... 455/426.1
(Continued)

FOREIGN PATENT DOCUMENTS

| CN | 1680825 A | 10/2005 |
|---|---|---|
| JP | 2004040666 A | 2/2004 |

(Continued)

OTHER PUBLICATIONS

Jul. 2015 Update: Interim Eligibility Guidance Quick Reference Sheet.*

(Continued)

*Primary Examiner* — Marisol Figueroa
(74) *Attorney, Agent, or Firm* — Norton Rose Fulbright US LLP

(57) ABSTRACT

Methods and apparatus for communication of notifications are disclosed. A disclosed method for communicating notifications from a server to a device includes sending a primary message including data indicating notification status information; and sending notification messages apart from the primary message addressed to specific groups of devices. Similarly, another disclosed method for obtaining notifications in a device from a server includes monitoring the primary message including current notification status information, comparing the current notification information status information with a previous notification status information to determine if a change in notification status information has occurred, and obtaining addressed notification information when a change in the notification status information has been determined. By using a primary message with abbreviated information to communicate whether changes to notification information have occurred without the need for further processing and/or addressed notification messages, system resources can be conserved. Corresponding apparatus are also disclosed.

21 Claims, 9 Drawing Sheets

(51) Int. Cl.
*H04W 4/06* (2009.01)
*H04W 72/00* (2009.01)
*H04L 12/18* (2006.01)
*H04L 12/58* (2006.01)

(52) U.S. Cl.
CPC ............ *H04L 51/24* (2013.01); *H04W 68/025* (2013.01); *H04L 12/5895* (2013.01); *H04W 4/06* (2013.01); *H04W 72/005* (2013.01)

(56) References Cited

U.S. PATENT DOCUMENTS

| | | | |
|---|---|---|---|
| 6,421,540 | B1 | 7/2002 | Gilhousen et al. |
| 6,628,946 | B1 | 9/2003 | Wiberg et al. |
| 6,941,354 | B2 | 9/2005 | Odamura |
| 6,950,419 | B1 | 9/2005 | Park et al. |
| 7,069,333 | B1 | 6/2006 | Morris et al. |
| 7,123,900 | B2 | 10/2006 | Brown et al. |
| 7,400,625 | B2 | 7/2008 | Rizzo et al. |
| 7,747,995 | B2 | 6/2010 | Fritsch et al. |
| 8,284,752 | B2 | 10/2012 | Ketchum et al. |
| 8,942,739 | B2 | 1/2015 | Kannan et al. |
| 2002/0129089 | A1 | 9/2002 | Hegde et al. |
| 2002/0168985 | A1 | 11/2002 | Zhao et al. |
| 2003/0134651 | A1 | 7/2003 | Hsu |
| 2003/0147390 | A1 | 8/2003 | Rizzo et al. |
| 2005/0014507 | A1 | 1/2005 | Iimori |
| 2005/0164683 | A1 | 7/2005 | Roberts et al. |
| 2005/0185610 | A1* | 8/2005 | Cheon ................... H04W 28/08 370/328 |
| 2005/0271004 | A1* | 12/2005 | Cho ...................... H04L 12/581 370/328 |
| 2006/0020938 | A1 | 1/2006 | Elcock et al. |
| 2006/0068780 | A1 | 3/2006 | Dalsgaard et al. |
| 2006/0166693 | A1 | 7/2006 | Jeong et al. |
| 2006/0174271 | A1 | 8/2006 | Chen et al. |
| 2006/0187897 | A1 | 8/2006 | Dabbs, III |
| 2006/0189300 | A1* | 8/2006 | Hwang et al. .............. 455/412.2 |
| 2007/0042757 | A1* | 2/2007 | Jung et al. ................. 455/412.2 |
| 2007/0172059 | A1 | 7/2007 | Yamaguchi et al. |
| 2007/0280235 | A1 | 12/2007 | Chen |
| 2007/0287440 | A1 | 12/2007 | Benkert et al. |
| 2008/0108376 | A1 | 5/2008 | Chen et al. |

FOREIGN PATENT DOCUMENTS

| | | |
|---|---|---|
| JP | 2005039369 A | 2/2005 |
| JP | 2005204305 A | 7/2005 |
| JP | 2006018359 A | 1/2006 |
| JP | 2008535365 A | 8/2008 |
| JP | 2009536393 A | 10/2009 |
| WO | WO-03063417 A2 | 7/2003 |
| WO | WO-2005015861 | 2/2005 |
| WO | WO-2005039128 A1 | 4/2005 |
| WO | WO-2006012378 | 2/2006 |
| WO | WO-2006030290 A2 | 3/2006 |
| WO | WO-2006082812 A1 | 8/2006 |
| WO | WO-2006104335 A2 | 10/2006 |
| WO | WO-2007143392 A2 | 12/2007 |
| WO | WO-2008057891 | 5/2008 |

OTHER PUBLICATIONS

ETSI TS 143 246 "Digital Cellular Telecommunications System (Phase 2+); Multimedia Broadcast/Multicast Service (MBMS) in the GERAN; Stage 2 (3GPP TS 43.246 version 6.9.0 Release 6)." Oct. 12, 2006. pp. 1-35. vol. 3-G1, No. V690. European Telecommunications Standards Institute, Sophia-Antipo, France, XP014035780.
International Search Report—PCT/US07/083808, International Search Authority—European Patent Office, May 8, 2008.
Luby, et al., "FLUTE—File Delivery over Unidirectional Transport", IETF RFC 3926, Oct. 2004, pp. 1-35.
Taiwan Search Report—TW096141953—TIPO—Sep. 21, 2011.
Written Opinion—PCT/US07/083808, International Search Authority—European Patent Office, May 8, 2008.

\* cited by examiner

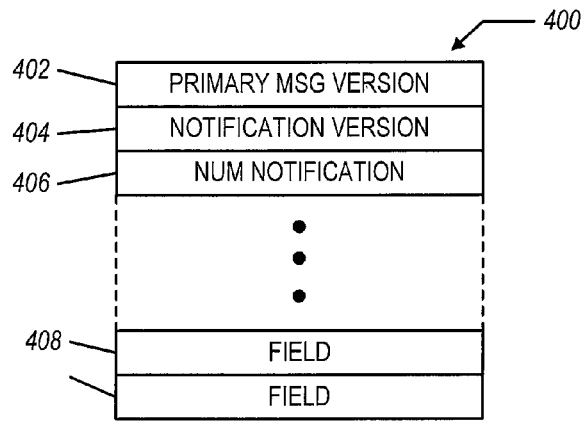
FIG. 4
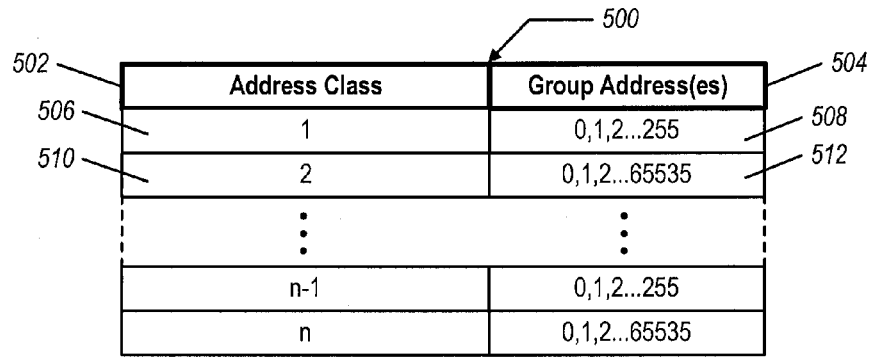
FIG. 5
| Address Class | Address Class Value | Address Field |
|---|---|---|
| Global | 0x00 | -- |
| Service Provider | 0x01 | BCS Provider ID |
| Content Retailer | 0x02 | Content Retailer ID |
| Package | 0x03 | Package ID |
| Tier | 0x04 | Tier ID |
| Service | 0x05 | Service ID |
| Flow | 0x06 | Flow ID |
| Network Application | 0x07 | Network App ID |
| | 0x09-0xFF (reserved) | |
FIG. 6

METHODS AND APPARATUS FOR COMMUNICATION OF NOTIFICATIONS

The present application is a divisional of co-pending, commonly assigned, U.S. patent application Ser. No. 11/734,640 entitled "METHODS AND APPARATUS FOR COMMUNICATION OF NOTIFICATIONS" filed Apr. 12, 2007 which claims priority to U.S. Provisional Application No. 60/864,567 entitled "METHODS AND APPARATUS FOR DELIVERY OF NOTIFICATIONS" filed Nov. 6, 2006, and the present application is related to the following co-pending U.S. patent application Ser. No. 11/734,565 entitled "APPARATUS AND METHODS FOR COMMUNICATING SYSTEM STATE INFORMATION CHANGE TO WIRELESS DEVICES" filed Apr. 12, 2007, the disclosures of which are hereby incorporated herein by reference.

BACKGROUND

1. Field

The present disclosure relates generally to methods and apparatus for communication of notifications, and more particularly to communication of notifications in a wireless communication system where a primary message communicates the presence of current notifications and a notification message communicates addressed notification information.

2. Background

In a wireless broadcast environment, such as in orthogonal frequency division multiplexed (OFDM) broadcast systems, wireless devices need to obtain the latest or updated system state information so that users of such devices can access and receive the latest data or content over the wireless broadcast network with minimal delay. Specifically, in order to obtain the latest system state information, which may include system notifications intended for one or more wireless devices, each of the wireless devices needs to continuously receive and process the updated information. This procedure, however, introduces significant consumption of the wireless device power resources and, therefore, reduces its standby time. It is axiomatic that mobile devices by their nature have limited power and processing resources. Thus, the requirement to obtain the latest system state information, which utilizes processing and power resources, introduces many challenges for power conservation in wireless devices.

In order to conserve processing and power resources, the co-pending application entitled "APPARATUS AND METHODS FOR COMMUNICATING SYSTEM STATE INFORMATION CHANGE TO WIRELESS DEVICES" referred to above and incorporated by reference herein, introduces the concept of a broadcast flow termed the "primary flow" having an abbreviated primary message from which a device can quickly determine whether system state changes have occurred. In particular, the primary message in the primary flow may contain abbreviated or shorthand information for a device to quickly determine current system information in order to effect savings of processing resources and power. Even though a primary message may reduce the amount of information needed to communicate system information, however, notification messages, which are typically broadcast in other flows, such as a notification flow, may still be configured such that processing resources are wasted by processing one or more notification messages that are not relevant to a particular receiving device. That is, the notification messages are not targeted to specific devices or groups of receiving devices, thus a receiving device will expend resources to process notification messages even though those messages are not applicable to the device.

SUMMARY

According to an aspect of the present disclosure, a method for delivering notification information to one or more wireless devices is disclosed. The method includes sending a primary message including data indicating notification status information, and sending one or more notification messages separate from the primary message where each of the one or more notification messages addressed to at least one of the one or more wireless devices.

According to another aspect, an apparatus is disclosed for conveying system state information to a wireless device. The apparatus includes means for sending a primary message including data indicating notification status information. The apparatus also includes means for sending one or more notification messages separate from the primary message where each of the one or more notification messages addressed to at least one of the one or more wireless devices.

According to yet another aspect, a computer program product comprising a computer-readable medium is disclosed. The computer-readable medium includes code for causing a computer to send a primary message including data indicating notification status information. The medium also includes code for causing the computer to send one or more notification messages separate from the primary message where each of the one or more notification messages addressed to at least one of the one or more wireless.

According to still another aspect, a server processor for conveying system state information to a wireless device is disclosed. The server processor includes a first module for sending a first primary message including data indicating notification status information. The server processor also includes a second module for sending one or more notification messages separate from the primary message where each of the one or more notification messages addressed to at least one of the one or more wireless devices.

According to yet another aspect, a method for obtaining notification information in a wireless device is disclosed. The method includes monitoring a primary message including current notification status information, and comparing the current notification information status information with a previous notification status information to determine if a change in the notification status information has occurred. Further, the method includes obtaining at least one addressed notification information when a change in the notification status information has been determined.

According to still another aspect, an apparatus for receiving notification information disclosed including a means for monitoring a primary message including current notification status information. The apparatus also includes means for comparing the current notification information status information with a previous notification status information to determine if a change in the notification status information has occurred, and means for obtaining at least one addressed notification information when a change in the notification status information has been determined.

According to yet a further aspect of the present disclosure, a computer program product including a computer-readable medium is disclosed. The medium includes code for causing a computer to monitor a primary message including current notification status information, and code for causing the computer to compare the current notification information status information with a previous notification status information to determine if a change in the notification status information has occurred. The medium further includes code for causing the computer to obtain at least one addressed notification information when a change in the notification status information has been determined.

According to still one more aspect, a wireless device for receiving notification information is disclosed. The device includes a first module for monitoring a primary message including current notification status information. The device further includes a second module for comparing the current notification information status information with a previous notification status information to determine if a change in the notification status information has occurred. Finally, the device includes a third module for obtaining at least one addressed notification information when a change in the notification status information has been determined.

BRIEF DESCRIPTION OF THE DRAWINGS

FIG. 4 illustrates an exemplary format of a primary message that may be utilized in the presently disclosed apparatus and methods FIG. 5 illustrates an example of a notification message composite address format that may be utilized in the presently apparatus and methods.

FIG. 6 illustrates a further example of a scheme for ordering address classes and addressing using multiple levels of filtering based on generalized classes.

DETAILED DESCRIPTION

The present disclosure describes apparatus and methods to effect the communication of notification messages between a server and a device in communication with the server. By transmitting a primary message in a primary flow, such as with a server, where the primary message includes summarized or abbreviated data indicating whether a change in notification information has occurred, a receiving device can quickly determine whether it has received all the required notifications. By processing this abbreviated message, rather than a more complex message, processing and power resources of the device may be economized. Accordingly, a receiving device may achieve lower battery power consumption, while also reducing the aggregate level of processing needed to be performed by the device. Additionally, the multicast bandwidth required is reduced since a shorter or abbreviated message is first sent. Furthermore, the present disclosure introduces the use of notification messages within one or more notification flows, which are separate from the primary flow, that contain particular address information to target specific devices or groups of receiving devices.

Figure 1:
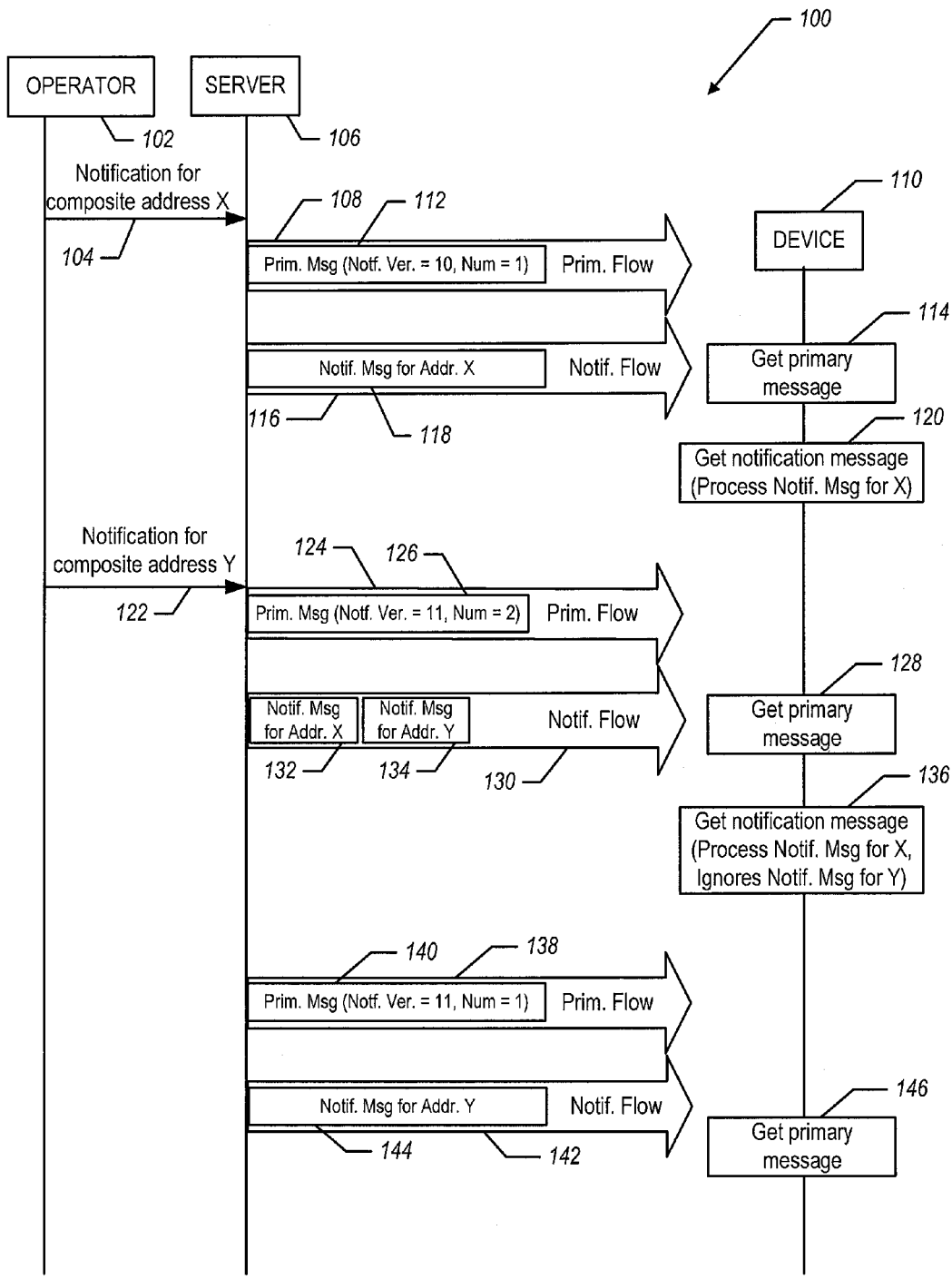
FIG. 1 is an illustration of an exemplary end-to-end call flow diagram illustrating conveyance of primary and notification messages between a server and device.

FIG. 1 shows an exemplary end-to-end call flow diagram illustrating how the presently disclosed primary message may be utilized in a communication system utilizing a notification mechanism. As illustrated in FIG. 1, the system 100 includes an operator 102 that configures notifications for devices within the particular system. In particular, operator 102 is operable to configure a notification for all devices belonging to a particular composite address X, as illustrated by arrow 104 between operator 102 and a server 106. The server 106, in turn, issues a primary message 112 in a primary flow 108 to one or more devices, such as device 110. Primary message 112 may consist of a system state version number useable by device 110 to determine if system state changes have occurred. This concept is more fully discussed in co-pending application entitled "Apparatus and Methods for Communicating System State Information Change to Wireless Devices" having Attorney Docket No. 061925 and incorporated by reference herein.

The primary message 112 may also include a notification version number or identifier and the total number of notifications presently available. This version number or identifier serves as a summary or abbreviated message to communicate changes of the notifications in an abbreviated manner; namely with a short message such as a single number, as an example, that is usable by the device 110 to quickly determine if new notifications are presently available. As an alternative, the primary message may not contain the number of notifications. The information concerning the number of notifications could be available in another flow or channel or by some other suitable means. In yet another alternative the primary message may contain the information on the exact group of devices to whom notifications are targeted and the number of notifications for that particular group. It is further noted that the server 106 may repeatedly broadcast the primary message 112 at a predetermined rate or frequency.

As further illustrated in FIG. 1, device 110 receives or obtains the primary message 112 as indicated by block 114. The device 110 may then process the primary message 112 to determine if further processing is necessary, such as acquiring or reading the notification information within the primary message. If the data in the primary message 112 communicates to device 110 that one or more new notification messages are present in one or more notification flows, device 110 may then listen to the one or more notification flows (e.g., notification flow 116) sent by server 106. The notification flows are configured to include one or more addressed notification messages. In the example of FIG. 1, a notification message for the particular composite address X is illustrated by message 118 in notification flow 116. The device 110 listens to the notification flow 116 to obtain the notification message 118 as indicated by block 120. As also indicated in block 120, the notification message 118 for composite address X is processed by device 110 at this time and may involve further requests by device 110 to server 106, although such communication is not illustrated in FIG. 1. Additionally, it is noted that instead of listening for a notification flow or flows (e.g., 116 as illustrated in FIG. 1), the system 100 may alternatively be configured such that device 110 issues a unicast request to server 106 for a notification message to which server 106 responds with a unicast transmission of the notification message.

FIG. 1 also illustrates an exemplary instance of a subsequent notification for composite address Y issued by operator 102 to the server 106 as indicated by arrow 122. In this instance, server 106 modifies the primary flow, as indicated by primary flow 124, to include a modified primary message 106 where the notification version is incremented or updated. In the example of FIG. 1, the previous notification version is shown as "10," whereas the updated notification version after notification for composite address Y (i.e., 122) is incremented to the number "11." Additionally, as may be seen in primary message 126, the number of notifications sent in primary message 126 is now two (2). The device 110, in turn, because of regular monitoring of the primary flow (e.g., 124), gets the primary message (e.g., 126) as indicated by block 128 and recognizes a change in the notification version by comparing the previous notification version stored by device 110 to the current notification version. In the example of FIG. 1, the device 110 then may listen to a subsequent notification flow 130, which includes the previously transmitted notification message for composite address X as well as a second notification message 134 for devices belonging to the composite address Y. For purposes of this example, it is assumed that the device 110 does not belong to composite address Y. Accordingly, because the device 110 only belongs to composite address X and not Y, the device 110 only processes the notification message 132 for composite address X as shown in block 136.

Furthermore, for purposes of this example, it is assumed that operator 102 may configure ending times for broadcasting particular notification messages (i.e., the notification messages are broadcast only for a set duration). More specifically, in this example it is assumed that operator 102 has configured the notification message for composite addresses X (i.e., message 104) to have an expiration or ending time. Accordingly, when a subsequent primary flow 138 is transmitted, it is assumed that the end time for broadcasting the notification for composite address X has passed or expired. Accordingly, FIG. 1 illustrates a primary message 140 where the number of notification messages indicated by primary message 140 is now only one, yet the notification version remains as notification version number 11. The notification version remains the same since no new notification messages have been issued from operator 102, even though the notification message for composite address X has expired and is no longer transmitted. The notification flow 142 then only includes the notification message 144 for devices belonging to composite address Y. Assuming the previous parameters, device 110 would get primary message 140 as indicated by block 146. In this example, since the notification version has not changed from the previous instance (i.e., block 128) of obtaining the primary message, device 110 will recognize that the notification version has not changed, in turn conclude that it is up to date on notifications, and not expend further resources for processing notifications.

Figure 2:
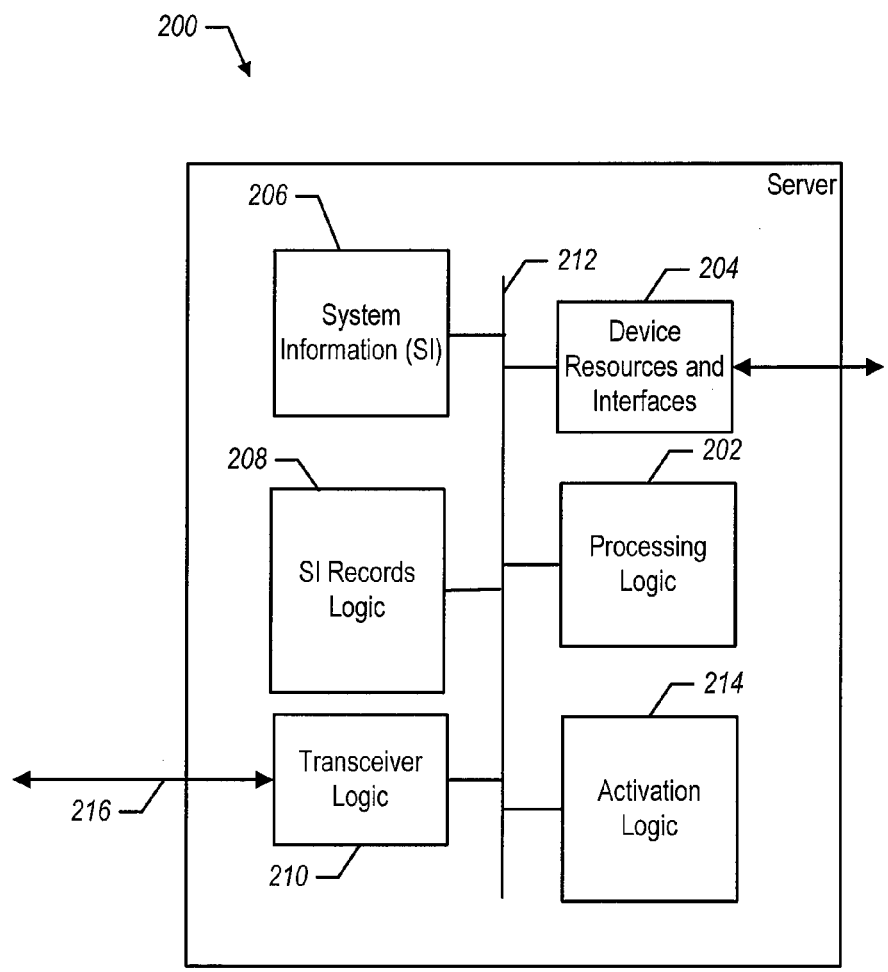
FIG. 2 illustrates an example of a server suitable for use in a content delivery system

FIG. 2 shows an example of a content provider server 200 suitable for use in a content delivery system. This server may be one example of a server that may be used as server 102 in FIG. 1. As shown in FIG. 2, server 200 includes processing logic 202, resources and interfaces 204, and transceiver logic 210, all of which are coupled to an internal data bus 212. The server 200 also includes activation logic 214, system information (SI) 206, and SI records logic 208, which are also coupled to the data bus 212.

In one or more examples, the processing logic or module 202 may include a CPU, processor, gate array, hardware logic, memory elements, virtual machine, software, and/or any combination of hardware and software. Thus, the processing logic 202 generally includes logic to execute machine-readable instructions and to control one or more other functional elements of the server 200 via the internal data bus 212.

The resources and interfaces module 204 may be implemented by hardware, software, or a combination thereof that allows the server 200 to communicate with internal and external systems. For example, the internal systems may include mass storage systems, memory, display driver, modem, or other internal device resources. The external systems may include user interface devices, printers, disk drives, or other local devices or systems, as examples.

Transceiver logic or module 210 may include hardware logic and/or software that operates to allow the server 200 to transmit and receive data and/or other information with remote devices or systems using a communication channel 216. For example, in one example, communication channel 216 may consist of any suitable type of communication link to allow the server 200 to communicate with a data network. It is noted that in the context of the system of FIG. 1, communication channel 216 may be utilized to effect delivery of the primary flow and notification flow(s) between the server (e.g., server 106) and a device (e.g., device 110).

The activation logic or module 214 may include a CPU, processor, gate array, hardware logic, memory elements, virtual machine, software, and/or any combination of hardware and software. The activation logic 214 operates to activate a server allowing the server to select and receive content and/or services described in the system information module 206, for example.

Figure 3:
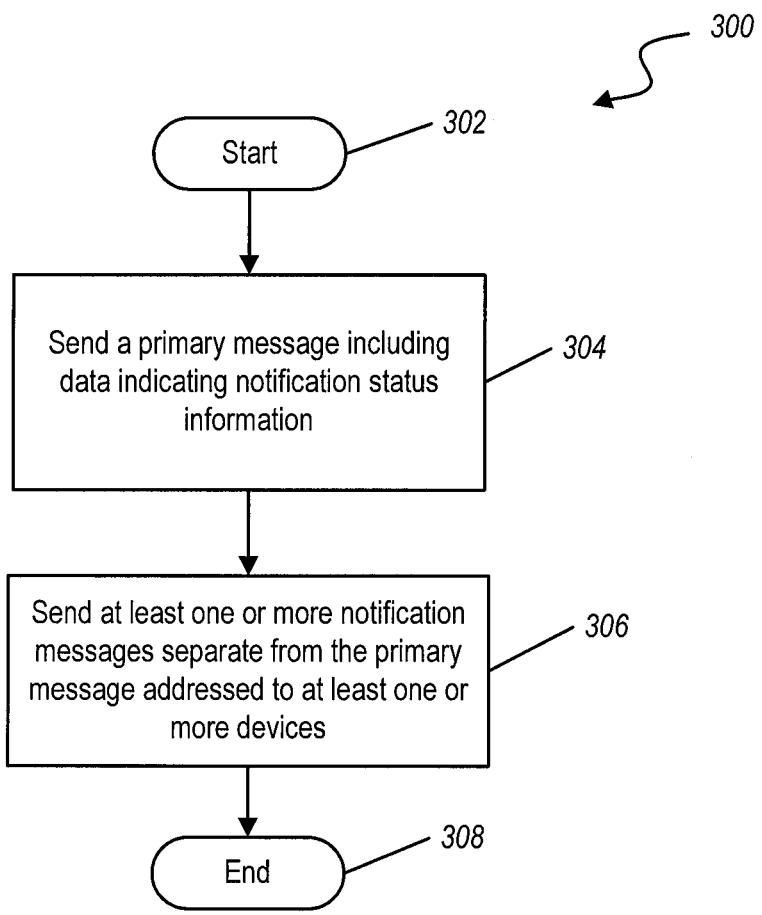
FIG. 3 is a flow diagram of an exemplary method for delivering notification information to a wireless device according to an example of the present disclosure

FIG. 3 illustrates a method for delivering notification information to a wireless device according to an example of the present disclosure. The method 300 begins at a start block 302 and proceeds to block 304. At block 304 primary message is sent that includes data indicating notification status information. It is noted that this procedure in block 304 may include sending at least the notification version number and may also include sending the number of notifications as was discussed previously in connection with FIG. 1. It is further noted that server 106 or 200 as discussed previously may effect the process of block 304. Further, in connection with the server 200 illustrated in FIG. 2 it is noted that the procedure of block 304 may be implemented through one or more of processing logic 202, system information 206, and transceiver logic 210, as examples from FIG. 2.

After the primary message is sent in block 304, flow proceeds to block 306 where one or more notification messages to specific devices are sent. Notification messages such as 118, 132, 134, or 144 shown in FIG. 1 include a specific targeted address targeting those devices to which the notification message is pertinent or relevant. Server 106 or server 200, as discussed previously may implement the procedure in block 306. In particular, concerning the example of server 200 in FIG. 2, this procedure may be effected by processing logic 202, transceiver logic 210 and system information 206, as examples.

After the procedure of block 306, flow proceeds to block 308 where procedure 300 ends. It is noted, however, that the primary message and notification messages may be continuously sent at periodic intervals as was discussed in the example of FIG. 1. Additionally, the primary message is sent in a primary flow and the notification messages are sent separate from the primary message in a notification flow as illustrated in FIG. 1.

FIG. 4 illustrates an exemplary format of a primary message that may be utilized in the presently disclosed apparatus and methods. As shown, the primary message 400 includes various fields including a primary version field 402. This field is more fully discussed in the cop-pending application entitled "Methods and Apparatus for Communicating System State Information to Wireless Devices," which is expressly incorporated by reference herein. Field 402 may consist of a version number, which is used by a receiving device, such as device 110, to quickly determine whether system state changes, such as changes in notifications, have occurred. If the primary message version has changed, thus indicating a system state change, device 110 may then process further information fields within the primary message 400, such as a notification version field 404. It is field 404 that communicates the notification version number to a device, such as device 110, enabling the device to quickly compare the current notification version with a previously stored version to determine if an operator has issued any notification messages. The primary message 400 also includes a number of notifications field 406, which communicates to receiving devices the current number of notifications being sent in a notification flow. As illustrated, the primary message 400 may also contain various other fields as indicated by fields 408.

FIG. 5 illustrates an example of a notification message composite address format that may be utilized in the presently disclosed apparatus and methods. As illustrated, the notification message 500 may include an address class 502 and an accompanying field indicating a group address 504. The address class 502 identifies the type of composite address and the group address 504 identifies the exact group of devices within the corresponding address class. For example, an address class can identify that a composite address addresses a group of devices subscribed to a service provider. A group address along with that address class can identify a group of devices subscribed to a particular service provider, such as Verizon, as an example. In another example, an address class can identify that a composite address addresses a group of devices subscribed to a channel. A group address along with that address class can identify a group of devices subscribed to a particular channel, such as MTV, for example. In addition to the composite address, the notification message 500 may also contain data for the target group, such as text, picture, or video or multimedia.

As shown in FIG. 5, the number of address classes may be any number one (1) through an n number of classes. FIG. 5 shows an exemplary list of address classes 502 and corresponding group addresses 504. As an example illustrated with reference to fields 506 and 508, a notification message could be targeted to a composite address (1,10), for example. Thus, this exemplary notification addresses a group having address 10 from a range of addresses 0 . . . 255 and within address class 1. As another example with reference to fields 510 and 512, a notification message could be targeted to a composite address (2, 30000) where the notification address a group having address 30000 from a range of address 0 . . . 66535 within address class 2.

FIG. 6 illustrates a further example of a composite address scheme 600 for ordering address classes and addressing using multiple levels of filtering based on generalized classes. In particular, the address composite address includes a particular address class indicated by column under heading 602, an address class value shown under heading 604 and an address field shown under heading 606. Examples of the types of address classes under heading 602 include a global address, billing and customer service provider class, content retailer class, package, tier, service, flow, and network application as examples. As may be seen in the table of FIG. 6, each of the address classes has a specified address class value corresponding to the address class. Examples of the address class values are illustrated in the column under heading 604.

Turning back to the example discussed above in connection with FIG. 5 where a composite address had a value (1,10), a corollary example may be made here in connection with FIG. 6. In particular, FIG. 6 shows an exemplary list of address classes 602. Accordingly, the notification message with composite address (1,10) would be targeted to devices that are subscribed to a "service provider" (i.e., address class 1 (e.g., 0x01)) having a group address value of 10.

It is noted that the configuration of the scheme 600 affords a second level of filtering by including an address field (see heading 606) with identification information further targeting one or more devices with further identification information. For example, in the address class consisting of the billing and customer service provider (see field 608), an address class value 0x01 relates to the particular address class. By further specifying a particular provider identification in the address field (see field 610), the second level of filtering can be accomplished. For example, in the case of a billing and customer service provider identification, an address or the address field could be 0xA0 to designate a service provider such as Verizon, whereas another service provider such as Cingular could have a different address such as 0xA1. Accordingly, when a notification in the billing and service provider address class is intended for Verizon, the address field would include further addressing to alert or inform only Verizon customers or users that a notification is extant for those users.

It is further noted that the composite address format is extensible in that yet further narrowed targeting of groups of devices may be effected. For example, the composite address could be extended to cover groups having more than one attribute, such as all Verizon users in San Diego subscribed to a Sports package but not a Movie package. As another example, further targeted addressing could be accomplished by performing a logical operation, such as AND and OR operations, with the address class and the address field as the operands in a logical operation that yields the targeted address. As yet another example, the composite address could be configured as a string address.

It is yet further noted here that in the example of FIG. 1, the composite message for address X is configurable according to either of the addressing format schemes illustrated in FIG. 5 or 6 to target specific groups of devices. Moreover, it is noted that FIG. 5 and FIG. 6 are merely exemplary, and that any number of different address classes may be contemplated by those skilled in the art.

Figure 7:
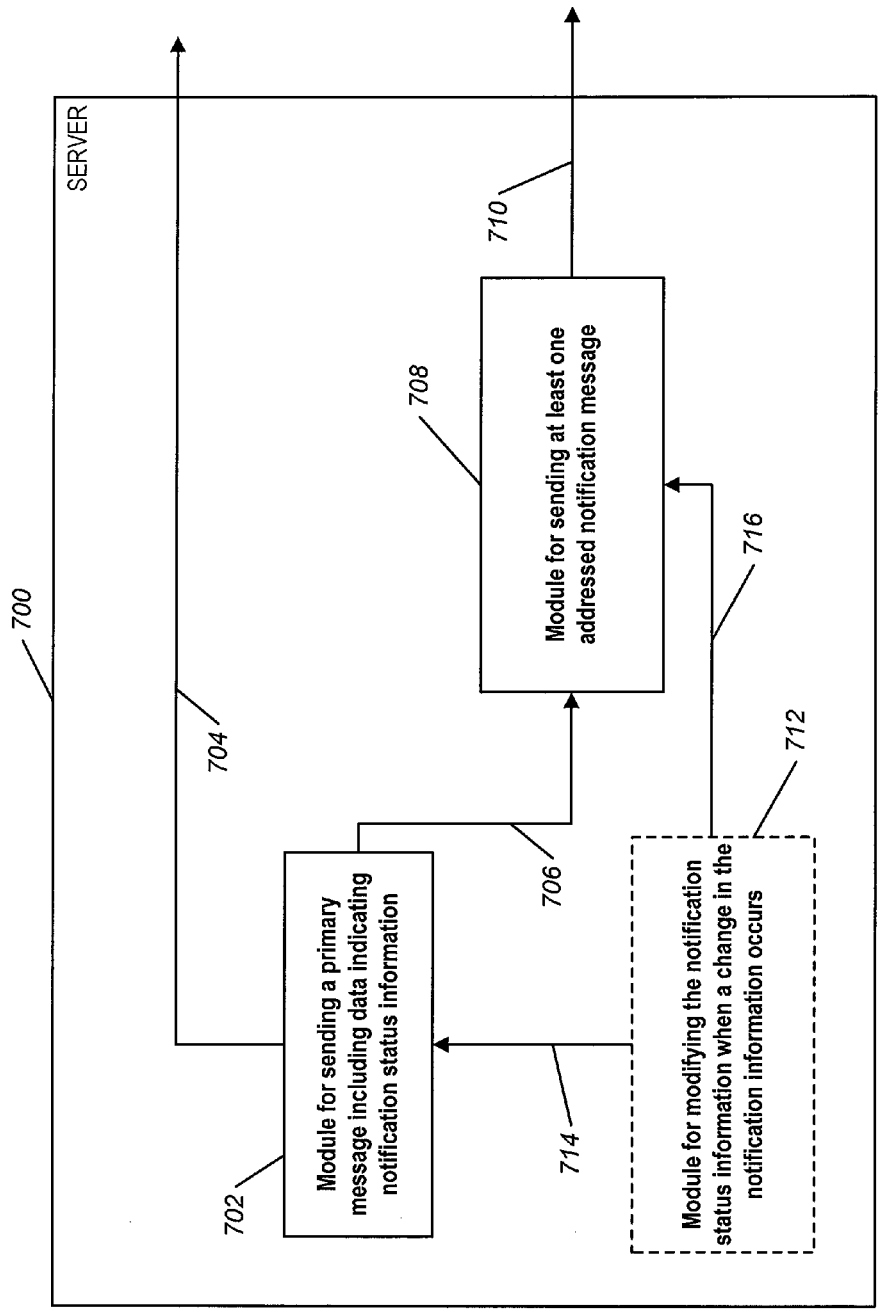
FIG. 7 illustrates an apparatus for serving content in a wireless network.

FIG. 7 illustrates an apparatus for serving content in a wireless network. As illustrated the apparatus may be a server 700 or server processor that includes a module for sending a primary message including data indicating notification status information 702. Module 702 may be implemented by one or more of the various modules illustrated in FIG. 2, for example. The primary message may be configured similar to the message 400 illustrated in FIG. 4. Accordingly, the primary message would include a notification version as well as the number of notifications, as an example.

The module 702 transmits the primary message to one or more user devices via a primary flow communication 704. Module 702 may be in communication with a module 708 for sending at least one notification message to one or more receiving devices, where the at least one notification message is an addressed notification message targeting one or more specific devices. Modules 702 and 708 may be in communication as indicated by coupling 706, although this is not necessary for implementation of server 700. Notification messages sent by module 708 include addressed notification message(s) such as those illustrated by the composite addresses of FIG. 5 or FIG. 6, as examples. The notification messages are sent via a notification flow or flows 710 to one or more user devices. It is noted that module 708 may be implemented by one or more of the various modules illustrated in FIG. 2. The apparatus 700 may also include a module 712, which is shown with broken lines, for modifying the notification status information when a change in the notification information occurs. Module 712 may, for example, be an interface with an operator, such as operator 102 in FIG. 1, that communicates the change in notification information to module 702 and/or module 708 via a communication couplings 714 and 716, respectively, to change the primary flow (704) and the notification flows (710).

Figure 8:
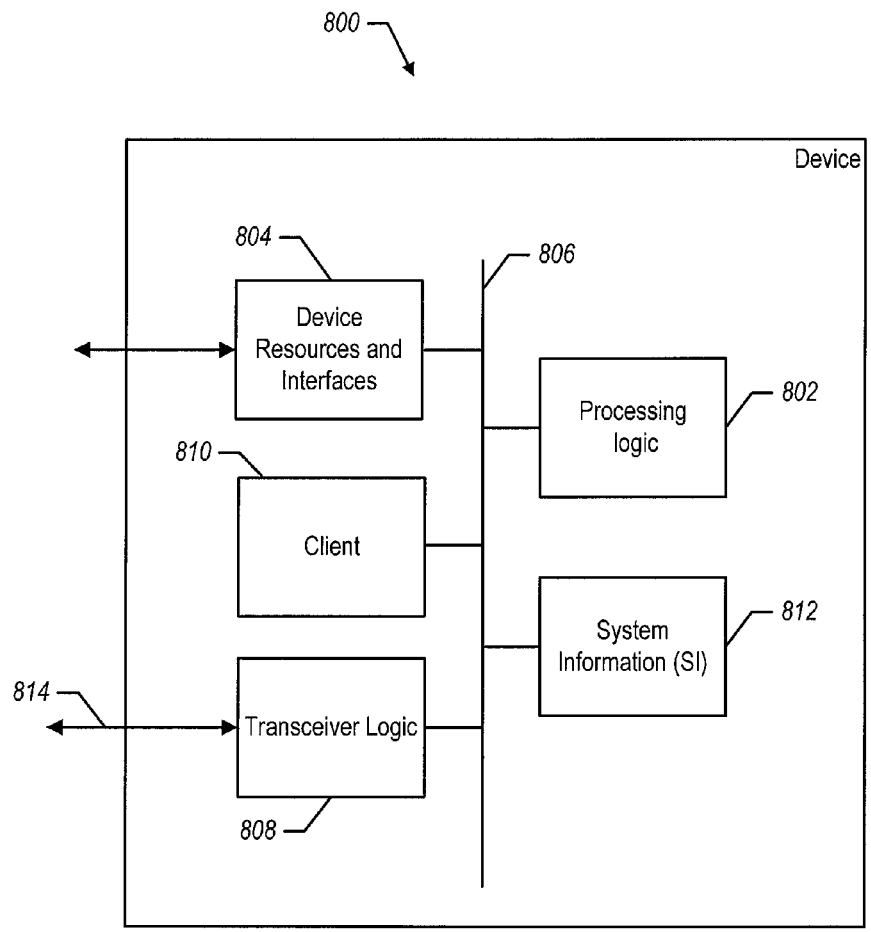
FIG. 8 illustrates an example of a device for use in a content delivery system.

FIG. 8 shows an example of a device 800 suitable for use in a content delivery system. For example, device 800 may be the device 110 shown in FIG. 1. Device 800 includes processing logic 802, resources and interfaces 804, and transceiver logic 806, all coupled to a data bus 808. The device 800 also comprises a client 810, a program logic 814 and a SI logic 812, which are also coupled to the data bus 808.

In one or more examples, the processing logic 802 may be implemented by a CPU, processor, gate array, hardware logic, memory elements, virtual machine, software, and/or any combination of hardware and software. Thus, the processing logic 802 generally comprises logic configured to execute machine-readable instructions and to control one or more other functional elements of the device 800 via the internal data bus 808.

The resources and interfaces 804 comprise hardware and/or software that allow the device 800 to communicate with internal and external systems. For example, internal systems may include mass storage systems, memory, display driver, modem, or other internal device resources. The external systems may include user interface devices, printers, disk drives, or other local devices or systems.

The transceiver logic 806 comprises hardware and/or software that operate to allow device 800 to transmit and receive data and/or other information with external devices or systems, such as server 106 or 200 shown in FIGS. 1 and 2, through communication channel 814. Communication channel 814 may comprise a network communication link, a wireless communication link, or any other type of communication link, as examples.

During operation, device 800 is activated so that it may receive available content or services over a data network. For example, the device 800 may identify itself to a content provider server during an activation process. As part of the activation process, device 800 receives and stores SI records by SI logic 812. The SI logic 812 contains information that identifies content or services available for the device 800 to receive. The client 810 operates to render information in the SI logic 812 on the device 800 using the resources and interfaces 804. For example, the client 810 may render information in the SI logic 812 on a display screen (not shown) that is part of device 800. The client 810 also receives user input through the resources and interfaces so that a device user may select content or services.

Figure 9:
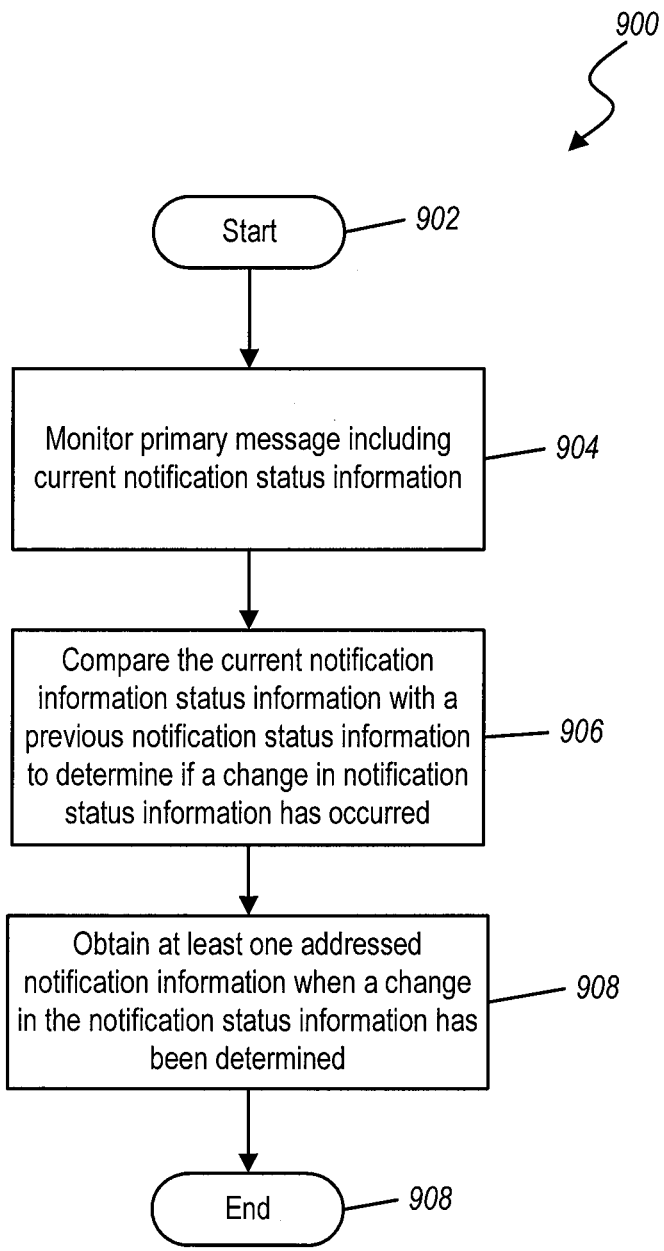
FIG. 9 is a flow diagram illustrating a method for obtaining notifications in a wireless device.

FIG. 9 is a flow diagram illustrating a method for obtaining a notification in a wireless device, such as device 110 or 800. As illustrated, the process 900 begins at a start block 902 and flow then proceeds to block 904. At block 904, a primary message, which includes current notification status information, is monitored. As explained previously, the notification status information is contained in the primary message, such as field 404 in message 400 and may consist of a notification version number.

At block 906, the current notification information status information is compared with a previous notification status information to determine if a change in notification status information has occurred. As discussed previously, the process of block 906 may consist of the device comparing the current notification version number against a previously stored version number to quickly determine whether changes have occurred to warrant further acquisition of the actual notification information. After the process of block 906, flow proceeds to block 908 where at least one addressed notification information is obtained when a change in the notification status information has been determined 908. It is noted that an example of the process of block 908 may be listening to the notification flow to obtain the addressed notification message(s) within the flow that pertain to the particular device. After the one or more notification messages are obtained, flow proceeds to block 910 where the process 900 ends. It is noted that the although process 900 is shown with start and end blocks, the process 900 may be repeated periodically at a predetermined time interval by a device. It is further noted that the device 110 in FIG. 1, device 800 in FIG. 8, or apparatus 1100, which will be discussed later in connection with FIG. 11, may implement process 900.

Figure 10:
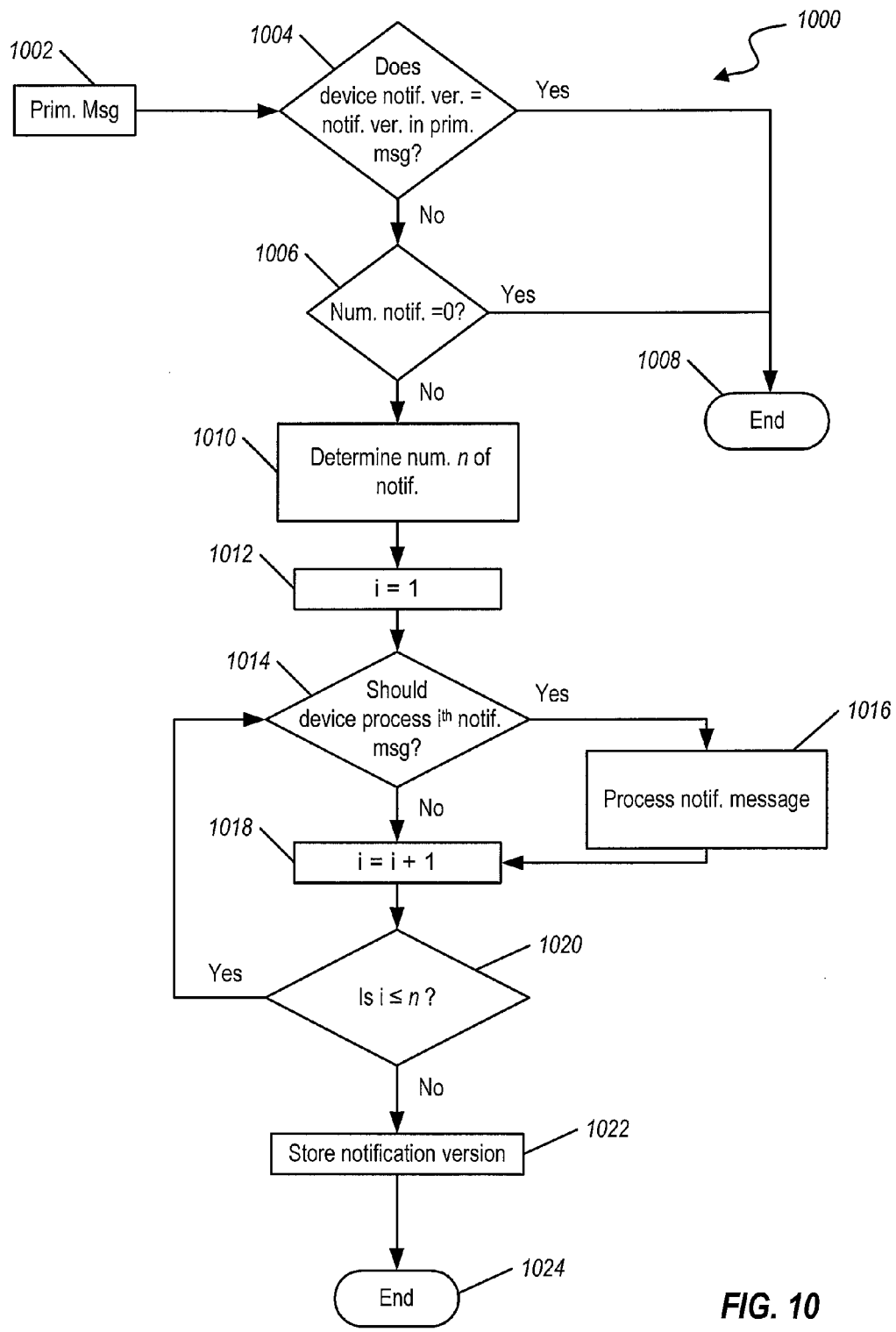
FIG. 10 is a flow diagram of another example of a method for obtaining notifications in a communication system.

FIG. 10 is a flow diagram of another example of a method for obtaining notifications in a communication system. As illustrated, the method 1000 starts at block 1002, where a primary message is received or monitored at a device, the primary message including a notification version number. Flow proceeds to decision block 1004 where a determination is made whether the notification version number stored in the device is the same as the currently transmitted notification version number contained in the primary message. If so, this indicates that no changes to the notifications have occurred and the process 1000 as indicated by end block 1008.

Alternatively, if the notification version has changed, the device will listen to the notification flow. Flow then proceeds from block 1004 to decision block 1006. Here, the device may determine if the current number of notification messages in the primary message is equal to zero (0). This situation may arise, for example, if an operator issues a notification of limited duration to the server, thus engendering a change in the notification version number. If the device was not turned on or receiving during the limited duration, the situation may arise where the notification version number has changed from a version currently stored in a device, but the number of notification messages is zero since the message have expired. If the condition of block 1006 is true, flow again proceeds to end block 1008 since no messages needs to be processed. It is noted that the process 1000 is ended until a next monitoring period of the device, at which time process 1000 is repeated.

If the condition of block 1006 is negative, flow proceeds to block 1010 where the device may determine what number n of present notification messages are extant from the primary message . That is, the number of notifications indicated in the primary message (e.g., field 406) can be utilized to determine the number n notifications. Alternatively, the number n of notifications could be communicated through other means, such as another message besides the primary message, or by any other suitable means.

After block 1010, flow proceeds to block 1012 where a count i is initialized to a value of one (1). Flow next proceeds to decision block 1014 for a determination of whether the device should process an $i^{th}$ notification message. That is, based on the state of the device (e.g., current location of the device, channel subscription list, etc.) or user preference (e.g., user might have voluntarily selected to receive notification about another location or another service), the device processes the notifications. The device uses the composite address in the notification message to determine whether the message is relevant to the device and should be processed. If the message is relevant, flow proceeds to block 1016 where the device processes the addressed notification message further. After processing or a start of processing in block 1016, flow proceeds to block 1018. Alternatively at block 1014, if the message is not relevant to device, such as in the example of block 136 in FIG. 1, flow proceeds directly from block 1014 to 1018.

In block 1018, the count i is incremented by a count of one (1) and flow then proceeds to decision block 1020. At block 1020 a determination is made whether the current value of count i is less than or equal to the total number n of notifications. If yes, flow loops back to block 1014 where the relevancy of the next $i^{th}$ message is determined. Once all notifications have been received, as determined by a "no" conclusion in block 1020, and the requisite or relevant notifications processed, the device will store the notification version received from the primary message, as indicated by block 1022. Flow proceeds to block 1024 where the process 1000 ends until repeated at a next monitoring period, for example. It is noted that the process 1000 may be implemented by may be implemented by the device 110 in FIG. 1, device 800 in FIG. 8, or apparatus 1100, which will be discussed below.

Figure 11:
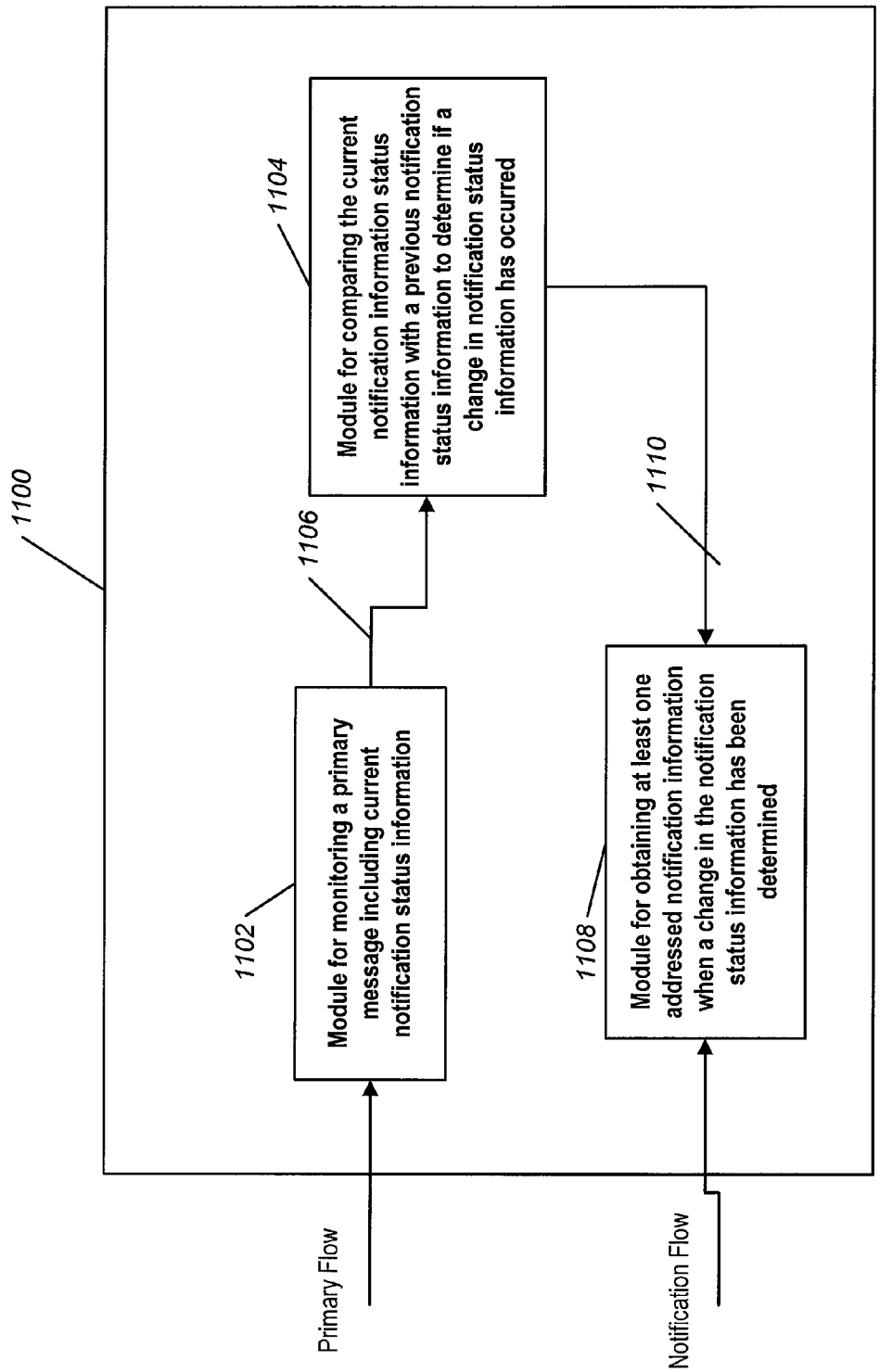
FIG. 11 is another example of an apparatus for obtaining notifications in a wireless device.

FIG. 11 illustrates another apparatus 1100 for obtaining notifications in a wireless device. As shown, the apparatus includes a module 1102 for monitoring a primary message including current notification status information. Module 1102 may be implemented, for example, by any one or more of the modules illustrated in device 800 in FIG. 8. Module 1102 is in communication with a module 1104 via a communication link 1106. Module 1104 is used for comparing the current notification information status information with previous notification status information to determine if a change in notification status information has occurred. As an example, the notification status information may include a notification version number, which module 1104 compares with a previously stored notification version number. If a difference or change is detected, module 1104 communicates with a module 1108 via a communication link 1110.

Module 1108 is configured to monitor or receive a notification flow and obtain at least one addressed notification information when the change in the notification status information has been determined by module 1104. Examples of this operation effected by module 1108 include receiving a notification message with a composite address, such as those illustrated in FIGS. 5 and 6, determining if the addressed message is relevant to a device in which apparatus 1100 is implemented, and processing the notification message when the message is relevant, as was discussed in connection with the method in FIG. 10 above. It is noted that the modules 1104 and 1108 may be implemented by any one or more of the modules illustrated in device 800 in FIG. 8, as an example.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processes of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for obtaining notification information in a wireless device, comprising:
    monitoring, by a processor, a primary message received through a wireless communication link by the wireless device and comprising current notification status information;
    comparing, by the processor, the current notification status information with a previous notification status information also received through the wireless communication link to determine if a change in the notification status information has occurred;
    obtaining, by the processor, at least one addressed notification information when a change in the notification status information has been determined, wherein the at least one addressed notification information comprises at least first address information corresponding to a respective address class and second address information corresponding to a particular group of wireless devices within the respective address class;
    determining if the at least one addressed notification information is relevant to the wireless device; and
    processing the at least one addressed notification information in response to the at least one addressed notification information being determined to be relevant to the wireless device.

2. The method as defined in claim 1, wherein the notification status information comprises a current notification version that is compared with a previous notification version of the previous notification status information.

3. The method as defined in claim 1, wherein obtaining the at least one addressed notification information comprises monitoring a notification flow containing the at least one addressed notification information.

4. The method as defined in claim 1, further comprising:
    determining a number of notification messages of the at least one addressed notification information.

5. The method as defined in claim 4, further comprising:
    determining the number of notification messages from the primary message.

6. An apparatus for receiving notification information, comprising:
    means for monitoring a primary message received through a wireless communication link by a wireless device and comprising current notification status information;
    means for comparing the current notification status information with a previous notification status information also received through the wireless communication link to determine if a change in the notification status information has occurred;
    means for obtaining at least one addressed notification information when a change in the notification status information has been determined, wherein the at least one addressed notification information comprises at least first address information corresponding to a respective address class and second address information corresponding to a particular group of wireless devices within the respective address class;
    means for determining if the at least one addressed notification information is relevant to the wireless device; and
    means for processing the at least one addressed notification information in response to the at least one addressed notification information being determined to be relevant to the wireless device.

7. The apparatus as defined in claim 6, wherein the notification status information comprises a current notification version that is compared with a previous notification version of the previous notification status information.

8. The apparatus as defined in claim 6, wherein the means for obtaining the at least one addressed notification information comprises means for monitoring a notification flow containing the at least one addressed notification information.

9. The apparatus as defined in claim 6, further comprising:
    means for determining a number of notification messages of the at least one addressed notification information.

10. The apparatus as defined in claim 9, further comprising:
    means for determining the number of notification messages from the primary message.

11. A computer program product, comprising:
    non-transitory computer-readable medium storing codes for obtaining notification information in a wireless device, the codes comprising:
    code for causing a computer to monitor a primary message received through a wireless communication link by the wireless device and comprising current notification status information;
    code for causing the computer to compare the current notification status information with a previous notification status information also received through the wireless communication link to determine if a change in the notification status information has occurred;
    code for causing the computer to obtain at least one addressed notification information when a change in the notification status information has been determined, wherein the at least one addressed notification information comprises at least first address information corresponding to a respective address class and second address information corresponding to a particular group of wireless devices within the respective address class;
    code for causing a computer to determine if the at least one addressed notification information is relevant to the wireless device; and
    code for causing a computer to process the at least one addressed notification information in response to the at least one addressed notification information being determined to be relevant to the wireless device.

12. The computer program product as defined in claim 11, wherein the notification status information comprises a current notification version that is compared with a previous notification version of the previous notification status information.

13. The computer program product as defined in claim 11, wherein the non-transitory computer-readable medium further comprises:
    code for causing a computer to obtain the at least one addressed notification information by monitoring a notification flow containing the at least one addressed notification information.

14. The computer program product as defined in claim 11, wherein the non-transitory computer-readable medium further comprises:
    code for causing a computer to determine a number of notification messages of the at least one addressed notification information.

15. The computer program product as defined in claim 14, wherein the non-transitory computer-readable medium further comprises:
    code for causing a computer to determine the number of notification messages from the primary message.

16. The computer program product as defined in claim 14, wherein the non-transitory computer-readable medium further comprises:
 code for causing a computer to determine the number of notification messages by monitoring a notification flow containing one or more notification messages if a change in the notification status information has been determined.

17. A wireless device for receiving notification information, comprising:
 a processor configured to execute instructions to:
  monitor a primary message received through a wireless communication link by the wireless device and comprising current notification status information;
  compare the current notification status information with a previous notification status information also received through the wireless communication link to determine if a change in the notification status information has occurred;
  obtain at least one addressed notification information when a change in the notification status information has been determined, wherein the at least one addressed notification information comprises at least first address information corresponding to a respective address class and second address information corresponding to a particular group of wireless devices within the respective address class;
  determine if the at least one addressed notification information is relevant to the wireless device; and
  process the at least one addressed notification information in response to the at least one addressed notification information being determined to be relevant to the wireless device.

18. The wireless device as defined in claim 17, wherein the notification status information comprises a current notification version that is compared with a previous notification version of the previous notification status information.

19. The wireless device as defined in claim 17, wherein obtaining the at least one addressed notification information comprises monitoring a notification flow containing the at least one addressed notification information.

20. The wireless device as defined in claim 17, wherein the processor is also configured to execute instructions to:
 determine a number of notification messages of the at least one addressed notification information.

21. The wireless device as defined in claim 20, wherein the processor is also configured to execute instructions to:
 a fifth module for determining the number of notification messages from the primary message.

* * * * *